United States Patent Office 3,508,771
Patented Apr. 28, 1970

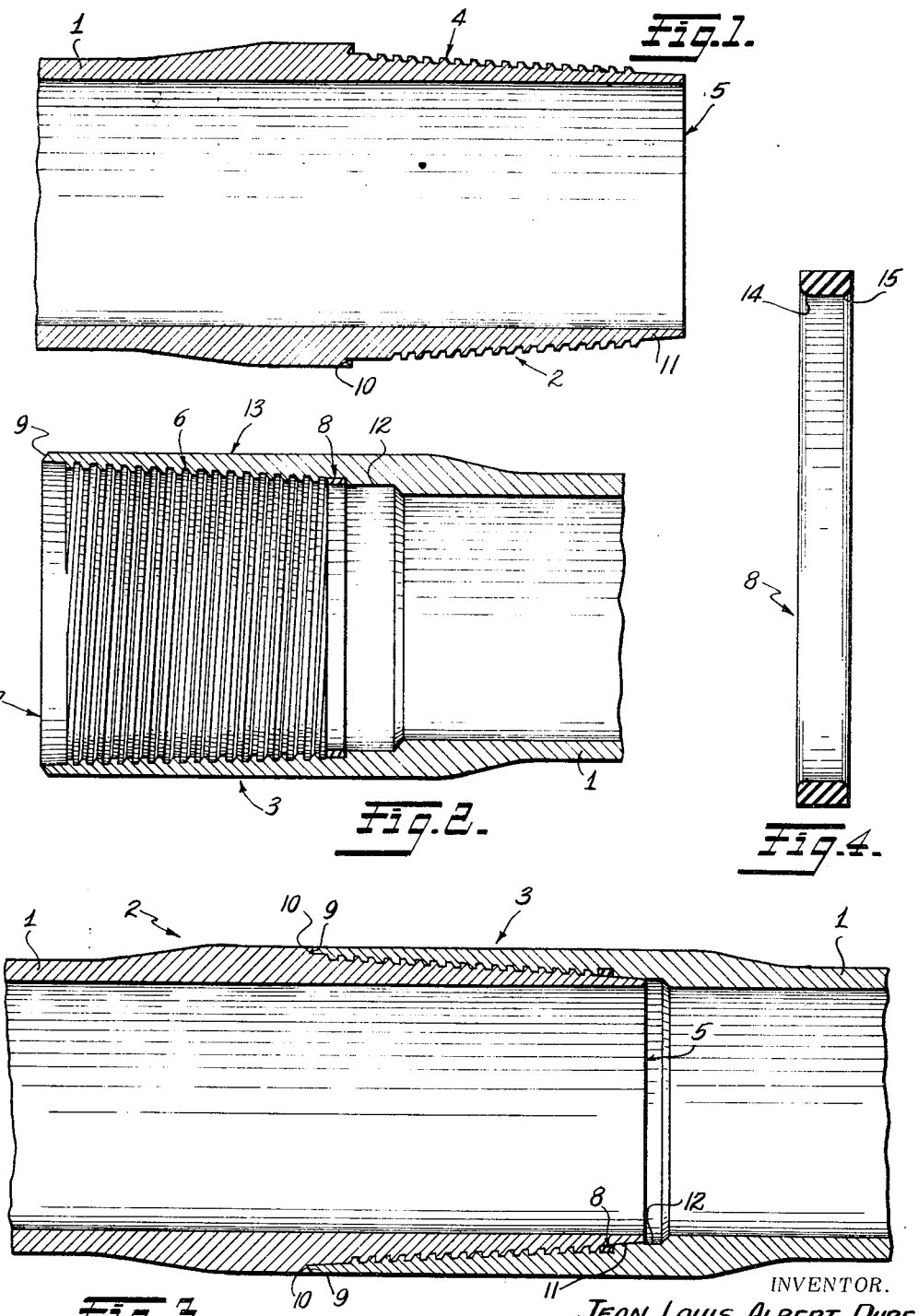

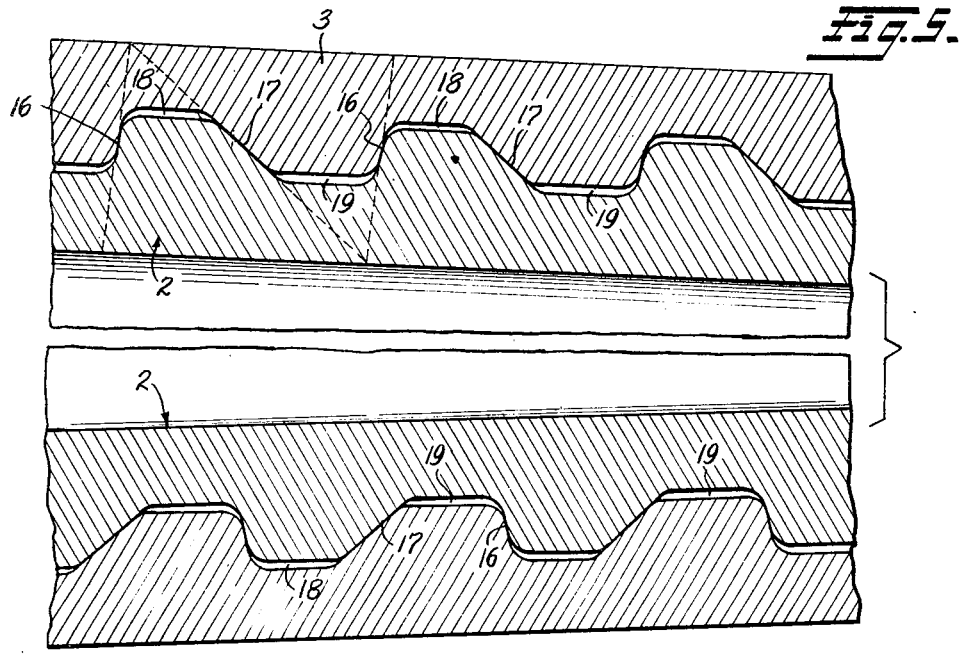
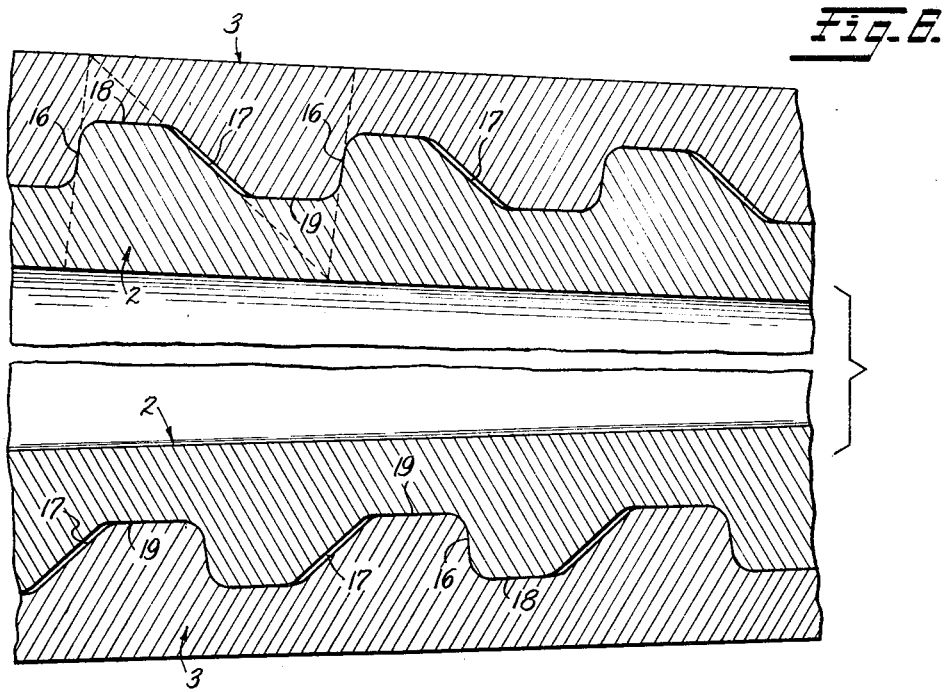

3,508,771
JOINTS, PARTICULARLY FOR INTERCONNECTING PIPE SECTIONS EMPLOYED IN OIL WELL OPERATIONS
Jean Louis Albert Duret, Aulnoye Aymeries, France, assignor to Societe Anonyme dite: Vallourec, Paris, France, a corporation of France
Continuation of application Ser. No. 406,489, Oct. 26, 1964. This application July 17, 1967, Ser. No. 654,018
Claims priority, application France, Sept. 4, 1964, 987,184
Int. Cl. F16l *25/00*
U.S. Cl. 285—334          5 Claims

ABSTRACT OF THE DISCLOSURE

A joint for repeatedly connecting and disconnecting pipe sections includes an externally threaded tapering male portion at one end of one section, with an external shoulder near its base, and a mating internally threaded tapering female portion at one end of the other section, the thickness of the threads on one portion being less than the width of the grooves between the threads on the other portion, so as to provide decreased resistance to entry of the male member into the female member until the tip of the female member strikes the shoulder.

CROSS-REFERENCES TO RELATED APPLICATIONS

This application is a continuation of my prior application, Ser. No. 406,489, filed Oct. 26, 1964, and now abandoned.

BACKGROUND OF THE INVENTION

It is known that the recovery of petroleum and natural gases requires the utilization of pipe sections that are connected or coupled together by means of joints forming conduits or pipe strings of great length placed in bore holes drilled in the ground.

The pipe sections must be connected together with the aid of joints which, on the one hand, have an exterior diameter corresponding as closely as possible to the exterior diameter of the pipe at points along the pipe away from the joints while, on the other hand, the interior dimensions of the joint must likewise be as close as possible to those of the interior diameter of the pipe at points away from the joints.

In view of these conditions, the provision of such joints presents a very difficult problem especially when it is desired to prevent stresses sufficient to cause fatigue at the joints, with a view to eliminating to a large extent the weakening of the pipe strings at the points where the strain is greatest.

Moreover, it is indispensable that the assembling and disassembling of the various pipe sections be very readily accomplished.

It is known to use tapered joints for this purpose which are constituted of two slightly conical contact surfaces (one male and the other female) provided with threads that permit tightening one pipe element over the other. The seal may be strengthened with the aid of a ring of plastic material placed near the end of the male threaded part which is crushed upon tightening the thread system of the joint. In this type of joint the end of the female part, upon being tightened, may abut against a shoulder machined at the base of the male threaded part.

The joints of the aforesaid type present a drawback that is due to the fact that if the tightening is effected, for example, by means of a torque wrench which prevents one pipe from rotating relative to the other when a given torque is attained, it may happen in the case of certain joints that the maximum torque is obtained only after the collapse and permanent deformation of the end of the female part against the shoulder at the base of the male threaded part has been produced.

It follows that if it is desired to again utilize one or the other part of the joint upon being permanently deformed in this manner, the physical damage, especially to the threads makes it impossible to provide adequate sealing characteristics and mechanical strength.

In addition to this, the permanent deformation has also the drawback that results from an increase in certain places of the exterior dimensions of the pipe as well as a decrease of the internal cross-sectional area of the pipe.

This drawback is particularly important since it may prevent the movement of certain measuring apparatus inside the pipe that must be lowered to the extreme end of the threadedly-engaged pipe sections, the dimensions of such apparatus being very close to those of the pipe.

SUMMARY OF THE INVENTION

The present invention relates to a joint of the aforesaid type which has been improved in such a way as to permit the tightening thereof with a predetermined torque load, without developing such permanent deformations that the dimensions of the joint no longer conform to manufacturing standards and that, upon being unscrewed, are no longer capable of use, with safety, for threaded engagement with other new pipes or unscrewed pipes.

The present invention constitutes an improvement of the joints of conventional type referred to above, the improvement being obtained by reinforcing, on the one hand, the efficacy and ruggedness of the stop means constituted by the shoulder of the male part against which abuts the end of the female part and, on the other hand, by reducing as much as possible the maximum resistance to the end of the male thread entering the area of the female thread during the entire period in which the end of the female thread part has not yet come to rest against the corresponding male part.

This reduction is accomplished by making the grooves between the threads wider than the threads themselves.

Thus, it is possible to achieve in accordance with the present invention a much greater regularity in the tightening of the pipe sections (which permits avoiding the permanent deformations of certain joints) by reducing the importance of the torque developed by the friction of the threads against each other and by rendering preponderant the influence of the blocking action exerted by the aforesaid shoulder.

In other words, the invention permits obtaining a much greater regularity of the tightening of the joints by causing, to the greatest extent possible, a balance between the torque load developed upon screwing together the two elements of the joint, and a torque in the opposite direction created by the shoulder of the male part against which abuts the end of the female part, while considerably reducing the source of friction upon the threaded parts, in the opposing torque which resists the torque load applied during the final tightening.

The object of the present invention is to provide a new industrial product that constitutes a joint employed for assembling pipe sections used more particularly in oil well drilling and producing operations. The joint is of the type wherein a threaded male part engages along a slightly tapered surface a female part also provided with a corresponding thread, the end of the female part coming to rest against a shoulder located at the base of the thread of said male part, the joint being essentially characterized in that the end of the female part is machined into the form of a convex truncated cone whereas the shoulder located at the base of the threaded male part presents a corresponding part shaped like a truncated cone or groove that is concave.

A further object of this invention is the provision of a new industrial product that constitutes a joint employed for assembling pipe sections having the characteristics indicated in the preceding paragraph, additionally characterized in that the dimensions of the threads of the male part and those of the threads of the female part are such that, upon assembly, a play is allowed to exist solely along the lateral part of the threads in an area where the screwing up of the joint causes no strain, which permits the provision of joints wherein the maximum torque for moving the end of the female part against the shoulder located in the male part is considerably smaller than that applied in the joints of known construction.

Another object of the invention is to provide a method of machining the male and female parts of joints of the type referred to above and, more particularly, the joints according to the present invention, this method being characterized in that the machining of the male part is proceeded with after having centered the end of the tube to be machined upon the internal surface of said end, and in that the female part is machined by first machining the external surface of the joint which has been previously centered with respect to the internal surface of the pipe, since after the machining of the external surface of the female part it is expedient to machine its internal surface and utilize, to effect the centering thereof, the external surface which was machined in the manner set forth.

Another object of the invention is to provide a new industrial product that constitutes a joint of the type referred to which is essentially characterized in that it is provided with a sealing ring, located at the base of the thread of the female part, which is made of a plastic material, such as polytetrafluoroethylene and has a section in which the two internal edges are rounded.

For a better understanding of the present invention, reference is made to the following description and the accompanying drawing, in which an embodiment of the invention is disclosed by way of example.

In the drawings:

FIG. 1 is a sectional view of the male part of a joint according to the present invention;

FIG. 2 is a sectional view of the female part of a joint according to the present invention which cooperates with the male part represented in FIG. 1;

FIG. 3 is a sectional view of the male part of FIG. 1 and the female part of FIG. 2 after they are assembled;

FIG. 4 shows partly in section a view of the sealing ring according to the invention;

FIG. 5 is a partly sectional view, on a larger scale, showing the area where the play is provided in a joint of known construction;

FIG. 6 is a partly sectional view, on a larger scale, showing the area where the play is provided in accordance with the present invention.

Referring now to the drawings, there is shown in FIG. 1 a system that includes a pipe 1, of which one portion has been machined to form the male part 2 of the joint whereas its other end has been machined to form the female part 3 of the joint in accordance with the present invention.

With reference to the embodiment of the joint illustrated in the drawing, the diameter of the pipe at the inside of the joint is shown to be the same as in the parts of the pipe that are outside of the joint.

As clearly shown in the drawing, the thread of the male part is located on a slightly tapered surface 4 in such a way that the diameter of the threads of the male part will increase proportionately to being spaced away from the end 5 of the male part of the joint.

In FIG. 2 it will be seen how the thread of the female part is located on a tapered surface 6 which has the same conicity as surface 4, so that the thread of the female part presents a smaller diameter at its base than at its end 7.

It is also shown sectionally in FIG. 2 how the sealing ring 8 is located in a recess of corresponding shape machined at the base of the thread of the female part.

This sealing ring is made, for example, of a plastic material such as polytetrafluoroethylene.

It will be seen in FIG. 2 that the end of the female part 9 is machined in the shape of a convex truncated cone whereas the shoulder 10 located at the base of the thread of the male part (FIG. 1) is machined in the shape of a concave truncated cone having the same conicity as the truncated cone obtained by machining the female part. The truncated cone according to the embodiment shown has a total slant of 120°.

FIG. 3 shows the manner in which the male and female parts of the joint are assembled in accordance with the present invention. The assembly is effected by screwing up the female part over the male part until the end 9 of the female part abuts against the shoulder 10 of the male part. The correct tightening of the joint is obtained upon applying to one of the parts a predetermined torque which is found to be within two values that are well defined with respect to the other part.

In the course of the tightening operation the sealing ring 8 is crushed by the smooth ends 11 of the male part in such a way that the plastic material becomes gripped between the end 11 and the groove 12 that is provided at the base of the thread of the female part of the joint.

The fact that according to the present invention the end of the female part has the form of a tuncated cone that corresponds to that of the shoulder of the male part of the joint against which the female end comes to rest, has the advantage, over the known devices of this type, of considerably increasing the rigidity of the end of the female part so that, notwithstanding the importance of the predetermined torque which can be transformed into contact pressure (for example if the male part has a minimum tolerance value and the female part has a minimum value) this will not result in any permanent deformation of one or the other of the two parts of the joint.

As a consequence, even after several assemblies of the various pipe sections, the values of the latter remain at the tolerance level of the various joints.

In order to machine the male part of the point, in accordance with the present invention, the end of the pipe to be machined is first centered by reference to the internal surface of the end of this pipe. As a result of this, the external surface of the male part is machined concentrically with respect to the internal face of the pipe.

In order to machine the male part of the joint, in accordance with the present invention, the external surface 13 of the female part is first machined by reference to the internal surface of the end of the pipe which, up to this point, has not been subjected to machining. As a result of this, the external surface 13 of the female part of the joint is machined concentrically with respect to the internal surface of the end of the pipe.

After having machined the external surface of the female joint the internal surface thereof is machined by first centering it with respect to the external surface 13 which has been machined in the manner just described.

In this way, it will be seen that the external surface 13 of the female part of the joint as well as its internal surface that is provided with a thread are concentric with respect to the internal bore of the pipe.

As a result of such a conformation of the male part and of the part, as described above, the manufacturing tolerances are found to be the same along the entire circumference of the male part and the female part of the joint. Thus, it is possible to avoid at the periphery the development of weakened points where there is a tendency therefore for a deformation to occur during the tightening of the joint. It is also possible to obtain in this manner a exact alignment of the internal surfaces of the various sections of the pipes, which insures easy passage of maintenance apparatus that must be lowered inside the string of pipes.

The method of machining the male and female parts referred to above is particularly suitable to the fabrication of joints in accordance with the present invention. However, it is understood that it could be used to advantage for obtaining joints of previously known types.

In FIG. 4 there is shown a diametric section of a sealing ring 8 according to the present invention.

In accordance with the invention, the internal edges 14 and 15 of the aforesaid ring are rounded. As a result of this, it does not matter in which direction the ring 8 faces upon being placed in the recess provided at the base of the thread of the female part of the joint, the end 11 of the male part 2 sliding easily on top of ring 8 which is therefore imprisoned in a perfectly uniform fashion along the entire circumference thereof as the joint is tightened.

In FIG. 5, which shows the area where it is desired to have a play in a joint of the type considered, but based upon the state of the art that preceded the present invention, it can be seen that the threads of the male part 2 engage those of the female part 3.

It will be noted that the blocking of the two parts of joint is insured by the fact that the lateral surfaces 16 and 17 of the threads 16 and 17 of the male part 2 are applied without any play against the corresponding lateral surfaces of the threads of the female part 3.

On the other hand, it should be noted that in conformity with the prior art relating to this type of joint, there has been left plays 18 and 19 between the crests of the threads of one part of the corresponding roots of the threads of the other part.

Thus, it will be understood that in the case of the prior art joints, the torque necessary for rotating the female part relative to the male part (before the shoulder 10 of the male part contacts the end of the female part) is of some importance because of the regular effect exerted by the two parts upon each other through the surfaces 16 and 17, this effect becoming increasingly more important as the surfaces in question form between themselves a smaller angle.

This wedging effect of the male part on the female part, obtained in accordance with the prior art is, moreover, quite irregular due to the difficulty encountered in machining threads having the high degree of geometrical accuracy required.

It would appear, therefore, that the joints represented in FIG. 5 offer not only a torque resistance applied during the assembly thereof, which is important, but that such torque resistance may vary within wide limits.

From the foregoing it is apparent that if the torque resistance exerted by the action of the threads of the male part upon those of the female part constitutes an important fraction of the torque that is necessary to balance the maximum tightening torque of the joint, it follows that important variations of the torque are ultimately imposed on the shoulder, especially since it must compensate the irregularities of the torque resistance developed by the threads.

In contrast to the above it is possible, in accordance with the present invention, to reduce to a maximum the torque exerted by the threads to oppose the tightening of the joint, which permits insuring a value that is much more constant for the torque exerted by the engagement of the shoulder with the end of the female part.

FIG. 6, which represents a joint in accordance with the present invention, shows the male part 2 as well as the female part 3.

In accordance with the invention, the dimensions of these male and female parts are such that in the course of the tightening operation there exists no play between the crests of the threads of one piece and the roots of the thread of the other piece, as clearly shown at 18 and 19. It is also noted that the play that is necessary for the assembly of the joint is solely found at the surfaces 17 of the threads, the tightening action exerting no effect whatsoever on these surfaces.

In contrast to the above, the surfaces 16 of the threads are in contact without the slightest play existing therebetween.

It can be seen that in accordance with the present invention there is no possible way of producing a wedging action of one thread on the other, which reduces very considerably the torque needed for tightening and which provides a torque that is much more constant notwithstanding the inherent irregularities in the fabrication of such threads.

As many possible embodiments may be made of the invention without departing from the scope thereof, it is to be understood that all matter herein set forth or shown in the accompanying drawings is to be interpreted as illustrative and not in a limiting sense.

Accordingly, the conicity of the shoulder located at the base of the thread of the male part against which abuts the end of the female part, may have values other than the 120° indicated above.

It is also apparent that it is possible to provide a joint in accordance with the invention wherein the external surface of the female part of the joint has the same diameter as the external diameter of the pipe, whereas at the level of the joint the interior of the pipe will have a diameter that is smaller than the diameter of its other parts.

It will also be appreciated that the invention can be practiced by the use of double joints that permit connecting the male ends of the two pipes.

Further, it is possible to provide in accordance with the present invention threaded male and female pipe ends made of a special, extra hard steel, which are secured by welding to the smooth ends of the pipes. The stems thus constituted can be screwed up and unscrewed many times. They are useful in the petroleum industry for special operations.

What is claimed is:

1. A joint for repeatedly connecting and disconnecting two cylindrical pipe sections, one of said sections being formed near one end into an externally threaded tapering male portion and a substantially transverse external shoulder positioned near the base of said threaded portion, while the other of said sections is formed near one end into an internally threaded female portion tapered to matingly receive said male portion and terminating in a transverse end surface which abuts against said external shoulder when said male and female portions are screwed together, at least one flank of the threads on said male portion and the mating flank on said female portion being positioned at an angle to a plane perpendicular to the axis of their respective portions and the thickness of the threads on said male portion being less than the width of the grooves between the threads on said female portion so that when the crests of the threads on one portion rest upon the bottoms of the grooves in the other portion a space is provided between the angularly positioned flanks of the threads on said male and female portions respectively.

2. A joint as claimed in claim 1 in which the pipe section comprising said female threaded portion is formed with an internally projecting shoulder near the inner end of the threads thereon, and the distance between the shoulder on the female portion and the beveled end surface thereon is less than the distance between the shoulder on said male portion and the end of said male portion so that a sealing ring may be accommodated between the end of said male portion and the shoulder on said female portion when said joint is fully made up.

3. A joint as claimed in claim 2 in which the concave groove in the shoulder on said male portion is formed by two surfaces meeting at a sharp angle at the bottom of the groove.

4. A joint as claimed in claim 1 in which said external shoulder defines a concave groove encircling said pipe and transverse end surface mates with said concave groove.

5. A joint as claimed in claim 1 in which the angularly positioned flank on the threads of the male portion is the leading flank.

References Cited

UNITED STATES PATENTS

| | | | |
|---|---|---|---|
| 2,450,452 | 11/1948 | Scott | 285—334 X |
| 2,907,589 | 10/1959 | Knox | 285—332.2 X |
| 3,047,316 | 7/1962 | Wehring et al. | 285—334 |
| 3,100,656 | 8/1963 | MacArthur | 285—333 X |

FOREIGN PATENTS 919,675   2/1963   Great Britain.

DAVE W. AROLA, Primary Examiner

U.S. Cl. X.R.

285—355